United States Patent
Yano et al.

(10) Patent No.: US 10,725,163 B2
(45) Date of Patent: Jul. 28, 2020

(54) RADAR APPARATUS AND TARGET OBJECT DETECTION METHOD OF RADAR APPARATUS

(71) Applicants: FURUKAWA ELECTRIC CO., LTD., Chiyoda-ku, Tokyo (JP); FURUKAWA AUTOMOTIVE SYSTEMS INC., Shiga (JP)

(72) Inventors: Hiroyasu Yano, Tokyo (JP); Yasushi Aoyagi, Tokyo (JP); Kodai Kukita, Tokyo (JP)

(73) Assignee: FURUKAWA ELECTRIC CO., LTD., Chiyoda-ku, Tokyo (JP)

( * ) Notice: Subject to any disclaimer, the term of this patent is extended or adjusted under 35 U.S.C. 154(b) by 219 days.

(21) Appl. No.: 15/553,160

(22) PCT Filed: Feb. 24, 2016

(86) PCT No.: PCT/JP2016/055530
§ 371 (c)(1),
(2) Date: Aug. 23, 2017

(87) PCT Pub. No.: WO2016/136845
PCT Pub. Date: Sep. 1, 2016

(65) Prior Publication Data
US 2018/0088223 A1 Mar. 29, 2018

(30) Foreign Application Priority Data

Feb. 25, 2015 (JP) ................................. 2015-035923
Feb. 25, 2015 (JP) ................................. 2015-035924

(51) Int. Cl.
*G01S 13/22* (2006.01)
*G01S 7/36* (2006.01)
(Continued)

(52) U.S. Cl.
CPC .............. *G01S 13/22* (2013.01); *G01S 7/292* (2013.01); *G01S 7/36* (2013.01); *G01S 13/12* (2013.01); *G01S 13/20* (2013.01)

(58) Field of Classification Search
CPC .......... G01S 13/22; G01S 13/20; G01S 13/12; G01S 7/292; G01S 7/36
(Continued)

(56) References Cited

U.S. PATENT DOCUMENTS 3,491,360 A 1/1970 Stoorvogel
4,973,968 A 11/1990 Hurd
(Continued)

FOREIGN PATENT DOCUMENTS

CN 1746698 A 3/2006
CN 103430041 A 12/2013
(Continued)

OTHER PUBLICATIONS

International Search Report for PCT Application No. PCT/JP2016/055530, dated May 24, 2016, 4 pages.
(Continued)

*Primary Examiner* — Bo Fan
(74) *Attorney, Agent, or Firm* — Amin, Turocy & Watson, LLP

(57) ABSTRACT

[OBJECT] To surely remove a multi-order echo or interference from another radar apparatus
[ORGANIZATION] A radar apparatus transmitting pulse signals at predetermined repetition cycles and receiving and analyzing the pulse signals reflected by a target object to thereby detect the target object has: a setting means (control unit 11) setting so that at least a part of the repetition cycles of the pulse signals is different; a detection means (speed detection/object detection unit 16) detecting a distance to the target object specified by the pulse signal; and a removal
(Continued)

means (clutter removal unit 17) removing the target object as clutter when the distance to the target object detected in the different repetition cycle or in a period subsequent to the different repetition cycle by the detection means and the distance to the target object detected in the period other than that by the detection means are different.

20 Claims, 13 Drawing Sheets

(51) Int. Cl.
  *G01S 13/12* (2006.01)
  *G01S 13/20* (2006.01)
  *G01S 7/292* (2006.01)

(58) Field of Classification Search
  USPC ................... 342/137, 134, 135, 82, 89, 160
  See application file for complete search history.

(56) References Cited

U.S. PATENT DOCUMENTS

2006/0055590 A1   3/2006   Moriya et al.
2010/0265121 A1*  10/2010  Bandhauer ............ G01S 7/2923
                                                  342/135
2014/0022114 A1*  1/2014   Kamimura ............. G01S 7/285
                                                  342/134
2014/0091964 A1*  4/2014   Comic ..................... G01S 7/02
                                                  342/189

FOREIGN PATENT DOCUMENTS

| JP | S5892878 A | 6/1983 |
| JP | S60100775 A | 6/1985 |
| JP | S61133885 A | 6/1986 |
| JP | H02266281 A | 10/1990 |
| JP | 04009786 A * | 1/1992 |
| JP | H049786 A | 1/1992 |
| JP | H0528980 U | 4/1993 |
| JP | H0968573 A | 3/1997 |
| JP | 2007240485 A | 9/2007 |
| JP | 2010216824 A | 9/2010 |

OTHER PUBLICATIONS

Extended European Search Report issued in the EP Patent Application No. EP16755589.5, dated Sep. 27, 2018, 10 pages.

Office Action issued in the CN Patent Application No. CN201680011205.7, dated Sep. 27, 2019, 17 pages (with translation).

* cited by examiner ns filing under 35 USC § 371 of international Patent

RADAR APPARATUS AND TARGET OBJECT DETECTION METHOD OF RADAR APPARATUS

CROSS-REFERENCE TO RELATED APPLICATIONS

This application is a U.S. National Stage patent application filing under 35 USC § 371 of international Patent Cooperation Treaty (PCT) Application No. PCT/JP2016/055530, filed on Feb. 24, 2016, and entitled "RADAR DEVICE AND TARGET DETECTION METHOD FOR RADAR DEVICE," which claims priority to Japanese Patent Application No. 2015-035923, filed on Feb. 25, 2015, and further claims priority to Japanese Patent Application No. 2015-035924, filed on Feb. 25, 2015, the entireties of each of which applications are hereby incorporated by reference herein in their entireties.

TECHNICAL FIELD

The present invention relates to a radar apparatus and a target object detection method of the radar apparatus.

BACKGROUND ART

In a conventional radar apparatus, in a case where an object having large reflection exists farther than a distance equivalent to a transmission repetition cycle, what is called a multi-order echo mixes into a reception signal, to cause erroneous detection.

As a technology to prevent influence by such a multi-order echo, in a technology disclosed in Patent Document 1, multi-order echo clutter is specified and deleted based on a difference between reception signals by transmission pulse cycles of a short distance range and a long distance range.

Further, in a technology disclosed in Patent Document 2, by using a transmission frequency signal which is set to a frequency which increases or decreases by a predetermined frequency every pulse repetition cycle, a primary echo and a multi-order echo can be discriminated based on a speed.

Further, in a technology disclosed in Patent Document 3, interference is avoided by arbitrarily selecting a plurality of transmission stagger-trigger generation circuits.

Further, in a radar apparatus, it is necessary to avoid interference between a reflection wave being a wave radiated by itself and reflected by a target object and a radio wave radiated from another radar apparatus, but avoiding the interference is not easy in a case where, in particular, the radar apparatus itself and another radar apparatus which becomes an interference source are similar radar apparatuses.

As a means to avoid such mutual interference, regarding a FMCW (Frequency Modulated Continuous Wave) radar, there is known a method to prevent interference by controlling a cycle, a transmission interval, or a modulation gradient of a FMCW modulation signal.

Further, regarding a pulse radar, there are known a method, as described in Patent Document 4, to prevent interference by controlling a turning direction of a circular polarized wave, a method, as described in Patent Document 5, in which transmission is halted, only a reception circuit is operated to receive a radio wave, a received signal is stored in a storage unit as an unnecessary signal, and thereafter, normal measurement is carried out and the unnecessary signal is removed therefrom, and so on.

Further, as a technology to remove clutter in a pulse radar, in general, there are known a method, as described in Patent Document 6, in which, regarding a composite pulse radar transmitting a plurality of transmission pulses during one cycle of transmission reception repetition cycles, a time interval between the transmission pulses is varied every transmission reception repetition cycle, that is, a pulse repetition frequency (PRF) is varied and in a case where a series of target reflection reception signals are observed with a timing of any transmission pulse among the transmission pulses being a criteria, the target reflection reception signals appearing at a different time position every repetition time period are removed by an asynchronous signal removal processing circuit, and so on.

PRIOR ART DOCUMENT

Patent Document

Patent Document 1: Japanese Utility Model Application Publication No. Hei 05-28980
Patent Document 2: Japanese Patent Application Laid-open No. 2007-240485
Patent Document 3: Japanese Patent Application Laid-open No. Sho 60-100775
Patent Document 4: Japanese Utility Model Application Publication No. Hei 09-68573
Patent Document 5: Japanese Patent Application Laid-open No. 2010-216824
Patent Document 6: Japanese Patent Application Laid-open No. Sho 61-133885

DISCLOSURE OF THE INVENTION

Problems to be Solved by the Invention

Incidentally, in the technology disclosed by Patent Document 1, it is necessary to process data equivalent to a measurement range of the long distance range in order to determine a multi-order echo within the short-distance range, which brings about a problem that a size of a processing circuit becomes large.

Further, in the technology disclosed by Patent Document 2, there are problems that a configuration becomes complicated since a transmission means capable of frequency modulation at a high speed is necessary, and so on.

Further, in the technology disclosed by Patent Document 3, in a coherent radar which computes relative speed information of a reflective object by using discrete Fourier transform (DFT), a reception sampling frequency becomes inconstant due to a stagger, which brings about a problem that uncertainty occurs in detection speed of a target object.

Further, in the technology disclosed by Patent Document 4, since the circular polarized wave is used, there are problems that a device for shifting a phase of a transmission radio wave by 90 degrees is necessary and that a structure of an antenna becomes complicated compared with a single polarized wave antenna, and so on.

Further, in the technology described in Patent Document 5, since the storage unit is necessary, there are problems that that the technology is disadvantageous in terms of size and cost, and that a signal of a genuine target may be removed as an unnecessary signal when the signal of the radar being the interference source is removed.

Further, in the technology described in Patent Document 6, there are problems that interference cannot be recognized in a case where a radar apparatus having a similar PRF as that of itself becomes an interference source, and so on.

The present invention is made in view of the above-described points, and aims at providing a radar apparatus capable of surely removing a multi-order echo or interference from another radar apparatus by a simple circuit configuration, and a target object detection method of the radar apparatus.

Means for Solving the Problems

In order to solve the above-descried problems, the present invention is characterized in that a radar apparatus transmitting pulse signals at predetermined repetition cycles and receiving and analyzing the pulse signals reflected by a target object to thereby detect the target object has: a setting means setting so that at least a part of the repetition cycles of the pulse signals is different; a detection means detecting a distance to the target object specified by the pulse signal; and a removal means removing the target object as an interference wave from another radar apparatus or clutter when the distance to the target object detected in the different repetition cycle or in a period subsequent to the different repetition cycle by the detection means and the distance to the target object detected in the period other than that by the detection means are different.

A configuration as above enables surely removing a multi-order echo or interference from another radar apparatus by a simple circuit configuration.

Further, the present invention is characterized in that the setting means sets so that at least a part of the repetition cycles of the pulse signals is different and so that a sampling cycle at a time of sampling the pulse signal is constant, and the removal means removes the target object as the clutter when the distance to the target object detected in the period subsequent to the different repetition cycle by the detection means and the distance to the target object detected in the period other than that by the detection means are different.

A configuration as above enables surely removing the multi-order echo by a simple circuit configuration.

Further, the present invention is characterized in that the setting means sets so that all the repetition cycles of the plurality of pulse signals existing in the sampling cycle are different.

A configuration as above enables removing the multi-order echo more surely.

Further, the present invention is characterized in that the setting means sets the repetition cycles with a unit being the pulse signals continuing a predetermined times at the same repetition cycles, and sets so that the repetition cycle of at least a part of unit among the plurality of units is different.

A configuration as above enables surely removing the multi-order echo by a simple circuit configuration, and enables making the sampling cycle constant, resulting in that occurrence of uncertainty in speed can be prevented.

Further, the present invention is characterized in that the removal means averages a detection signal in the different repetition cycle and a detection signal in the repetition cycle other than that to thereby make a clutter component relatively small.

A configuration as above enables removing the clutter component by a simple configuration.

The present invention is characterized in that the removal means removes the detection signal only in the predetermined repetition cycle as the clutter.

A configuration as above enables removing the clutter component by a simple configuration.

Further, the present invention is characterized in that the setting means sets so that at least a part of the repetition cycles of the pulse signals is different, and the removal means removes the target object as an interference wave from another radar apparatus when the distance to the target object detected in the different repetition cycle by the detection means and the distance to the target object detected in the repetition cycle other than that by the detection means are different.

A configuration as above enables surely removing interference from another radar apparatus by a simple circuit configuration.

Further, the present invention is characterized in that the setting means sets so that at least one repetition cycle of the plurality of pulse signals existing in the sampling cycle is different.

A configuration as above enables surely removing the interference wave by a simple circuit configuration, and enables making the sampling cycle constant, resulting in that occurrence of uncertainty in speed can be prevented.

Further, the present invention is characterized in that the setting means sets so that all the repetition cycles of the plurality of pulse signals existing in the sampling cycle are different.

A configuration as above enables removing the interference wave more surely.

Further, the present invention is characterized in that the setting means sets the repetition cycles with a unit being the pulse signals continuing a predetermined times at the same repetition cycles, and sets so that the repetition cycle of at least a part of unit among the plurality of units is different.

A configuration as above enables surely removing the interference wave by a simple circuit configuration, and enables making the sampling cycle constant, resulting in that occurrence of uncertainty in speed can be prevented.

Further, the present invention is characterized in that the setting means sets the repetition cycle so that an interference source is determined to exist in a case where a reception signal exists in a status where transmission of the pulse signal is halted, and so that the reception signal can be removed by the removal means.

A configuration as above enables surely detecting existence of the interference wave.

Further, the present invention is characterized in that the removal means averages a detection signal in the different repetition cycle and a detection signal in the repetition cycle other than that to thereby make an interference wave component relatively small.

A configuration as above enables surely removing the interference wave component by a simple configuration.

Further, the present invention is characterized in that the removal means removes the detection signal only in the predetermined repetition cycle as the interference wave component.

A configuration as above enables surely removing the interference wave component by a simple configuration.

Further, the present invention is characterized in that a target object detection method of a radar apparatus transmitting pulse signals at predetermined repetition cycles and receiving and analyzing the pulse signal reflected by a target object to thereby detect the target object has: a setting step of setting so that at least a part of the repetition cycles of the pulse signals is different; a detecting step of detecting a distance to the target object specified by the pulse signal; and a removing step of removing the target object as an interference wave from another radar apparatus or clutter when the distance to the target object detected in the different repetition cycle or a period subsequent to the different repetition cycle in the detecting step and the distance to the target object detected in the period other than that in the detecting step are different.

The method as above enables surely removing a multi-order echo or interference from another radar apparatus by a simple circuit configuration.

Effect of the Invention

According to the present invention, it is possible to provide a radar apparatus capable of surely removing a multi-order echo or interference from another radar apparatus by a simple circuit configuration, and a target object detection method of the radar apparatus.

BEST MODE FOR CARRYING OUT THE INVENTION

Next, an embodiment of the present invention will be described.

(A) Explanation of Configuration of First Embodiment of Present Invention

Figure 1:
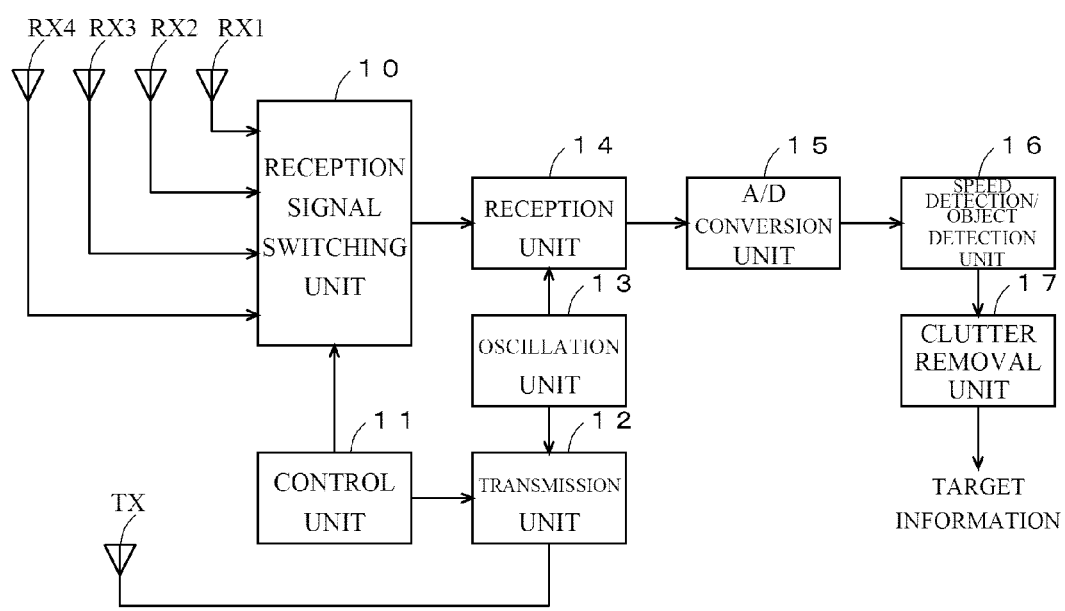
FIG. 1 is a diagram illustrating a configuration example of a radar apparatus according to an embodiment of the present invention.

FIG. 1 is a block diagram illustrating a configuration example of a radar apparatus according to a first embodiment of the present invention. As illustrated in FIG. 1, major components of the radar apparatus according to the first embodiment of the present invention are a transmission antenna TX, reception antennas RX1 to RX4, a reception signal switching unit 10, a control unit 11, a transmission unit 12, an oscillation unit 13, a reception unit 14, an A/D (Analog to Digital) conversion unit 15, a speed detection/object detection unit 16, and a clutter removal unit 17. Note that the radar apparatus according to this embodiment will be explained by exemplifying a case where the radar apparatus is mounted on a vehicle such as an automobile and operated as an apparatus to detect another vehicle, an obstacle, a pedestrian, or the like, for example. It is a matter of course that the radar apparatus can be equipped to a movable body other than the vehicle.

Here, the transmission antenna TX is an antenna which transmits a pulse signal supplied from the transmission unit 12 to a target object as a radio wave. The reception antennas RX1 to RX4 are antennas which receive the radio waves having been transmitted from the transmission antenna TX and reflected by the target object, and supply to the reception signal switching unit 10 as electrical signals.

The reception signal switching unit 10 is controlled by the control unit 11, selects any one of the reception antennas RX1 to RX4, and supplies a reception signal supplied from the selected reception antenna to the reception unit 14.

The control unit 11 controls the transmission unit 12 to transmit a pulse signal at a predetermined timing, and controls the reception signal switching unit 10 to supply the signal received by any one of the reception antennas RX1 to RX4 to the reception unit 14.

The transmission unit 12 modulates a high frequency signal supplied from the oscillation unit 13, and generates a high frequency pulse signal to radiate into space via the transmission antenna TX.

The oscillation unit 13 oscillates at a predetermined frequency, and supplies the obtained high frequency signal (local signal) to the reception unit 14 and the transmission unit 12.

The reception unit 14 demodulates the reception signal supplied from the reception signal switching unit 10 by the high frequency signal supplied from the oscillation unit 13, to supply to the A/D conversion unit 15.

The A/D conversion unit 15 samples the signal supplied from the reception unit 14 at a predetermined frequency and converts into a digital signal by A/D conversion, to supply to the speed detection/object detection unit 16.

The speed detection/object detection unit 16 executes, to the digital signal supplied from the A/D conversion unit 15, processing of pre-summing and DFT (Discrete Fourier Transform) and so on, carries out speed detection of the reception signal, to detect the target object from information of a Doppler frequency of an object and information of a distance.

The clutter removal unit 17 executes processing of removing multi-order echo clutter and an interference signal from object detection information supplied from the speed detection/object detection unit 16.

(B) Explanation of Operation of First Embodiment of Present Invention

Figure 2:
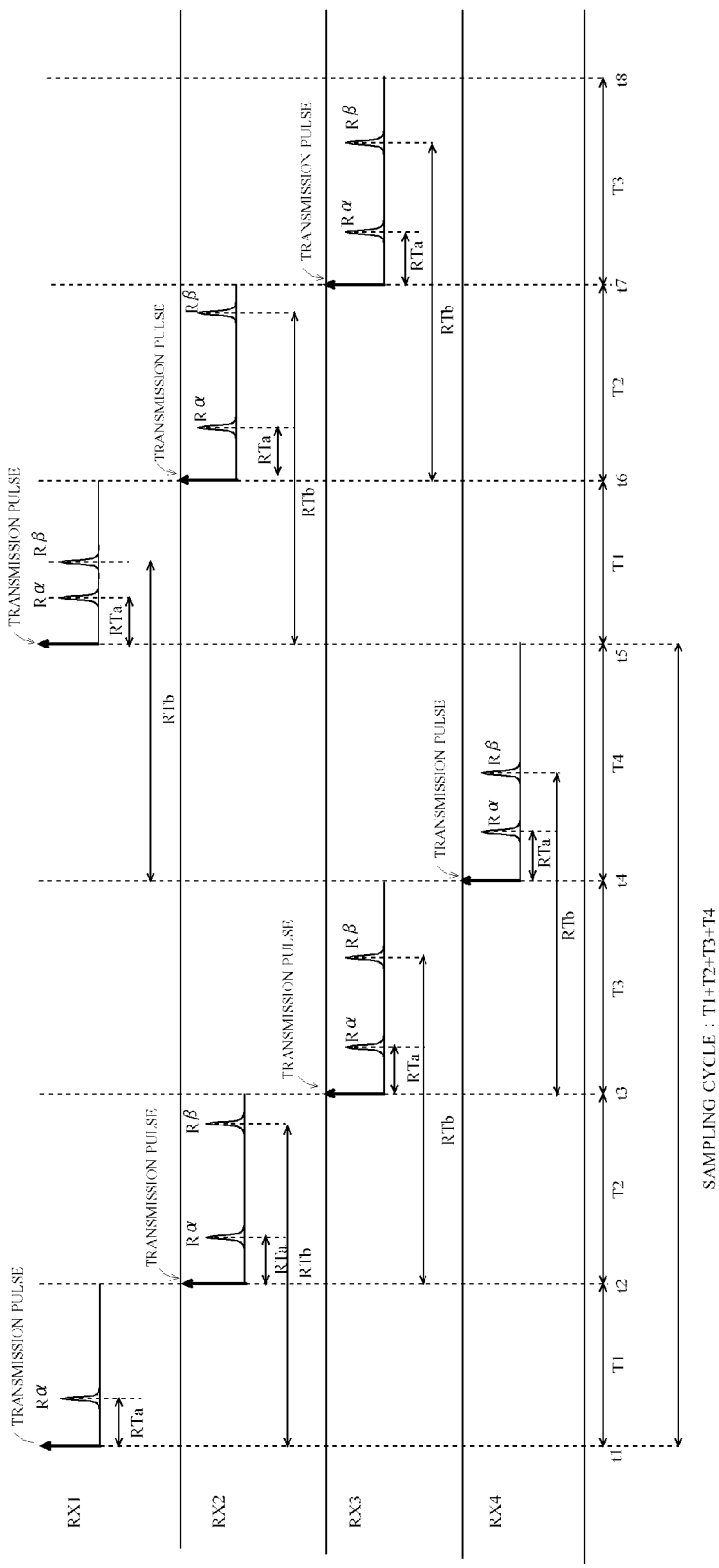
FIG. 2 is a diagram explaining an operation of the embodiment illustrated in FIG. 1.

Next, an operation of the first embodiment of the present invention will be described. FIG. 2 is a timing chart explaining an operation of the embodiment illustrated in FIG. 1. Note that in FIG. 2, a horizontal axis indicates a time and RX1 to RX4 in a vertical axis indicate pulse signals received by the reception antennas RX1 to RX4.

For example, when an ignition key of a vehicle on which the radar apparatus illustrated in FIG. 1 is mounted is turned on, a not-illustrated ECU (Electric Control Unit) instructs the control unit 11 of the radar apparatus illustrated in FIG. 1 to start an operation. As a result, the control unit 11 controls the transmission unit 12 to transmit pulse signals at a predetermined cycle and controls the reception signal switching unit 10 to select any one of the reception antennas RX1 to RX4. In more detail, the control unit 11, as illustrated in FIG. 2, at a timing t1, controls the reception signal switching unit 10 to select the reception antenna RX1 and controls the transmission unit 12 to transmit a transmission pulse (pulse indicated by a heavy line arrow in FIG. 2). When a pulse repetition cycle T1 passes since transmission of the transmission pulse, the control unit 11, at a timing t2, controls the reception signal switching unit 10 to select the reception antenna RX2 and controls the transmission unit 12 to transmit a transmission pulse. Further, when a pulse repetition cycle T2 passes since transmission of the transmission pulse, the control unit 11, at a timing t3, controls the reception signal switching unit 10 to select the reception antenna RX3 and controls the transmission unit 12 to transmit a transmission pulse. Similarly, when a pulse repetition cycle T3 passes since transmission of the transmission pulse, the control unit 11, at a timing t4, controls the reception signal switching unit 10 to select the reception antenna RX4 and controls the transmission unit 12 to transmit a transmission pulse. Then, when a pulse repetition cycle T4 passes since transmission of the transmission pulse, the control unit 11, at a timing t5, controls the reception signal switching unit 10 to select the reception antenna RX1 and controls the transmission unit 12 to transmit a transmission pulse, and thereafter, similarly, there is repeated the operation of selecting the reception antenna RX2 after passage of the pulse repetition cycle T1 and transmitting the transmission pulse and selecting the reception antenna RX3 after passage of the pulse repetition cycle T2 and transmitting the transmission pulse. As a result, as illustrated in FIG. 2, the operation where the transmission pulses are transmitted every repetition cycle T1 to T4 is repeated. Note that in the embodiment illustrated in FIG. 1, the pulse repetition cycles T1 to T4 are set to become T1<T2<T3<T4.

The transmission pulse transmitted from the transmission antenna TX at the timing t1 is reflected by the target object, received by the reception antenna RX1, and supplied to the reception unit 14. When a time from transmission of the transmission pulse, through reflection by the target object, until reception by the reception antenna RX1 is referred to as RTa, as illustrated in FIG. 2, an echo Rα is received the time RTa later after transmission of the transmission pulse. Note that since the pulse repetition cycles T1 to T4 are quite short, a distance between a vehicle on which the radar apparatus is mounted and the target object hardly changes during that time, and thus, also in the pulse repetition cycles T2 to T4, the echo Rα is received after the time RTa passes since transmission of the transmission pulse.

The reception unit 14 demodulates the reception pulse by the high frequency signal supplied from the oscillation unit 13 and then outputs. The A/D conversion unit 15 converts the demodulated signal supplied from the reception unit 14 into a digital signal and then outputs. The speed detection/object detection unit 16 applies integrating processing, DFT processing, and so on to the digital signal supplied from the A/D conversion unit, to detect a speed and a position of the target object. Then, the speed and position of the target object are output as target information via the clutter removal unit (detailed operation thereof will be described later).

Incidentally, it is assumed that there exists a target object such as a truck, for example, which reflects a transmission pulse efficiently at a position over a detection range of the radar apparatus. In such a case, sometimes, a transmission pulse transmitted at a timing t1 is not received in a pulse repetition cycle T1 and is received in a pulse repetition cycle T2 being a period following thereto. For example, when a time necessary for reciprocation to the target object is RTb, the transmission pulse is detected as an echo Rβ the time RTb later after transmission of the transmission pulse at the timing t1, in a period of the pulse repetition cycle T2. Such an echo Rβ is referred to as a secondary echo. If such a secondary echo exists, the radar apparatus erroneously detects that the target object exists at a position corresponding to a time (RTb−T1).

Figure 3:
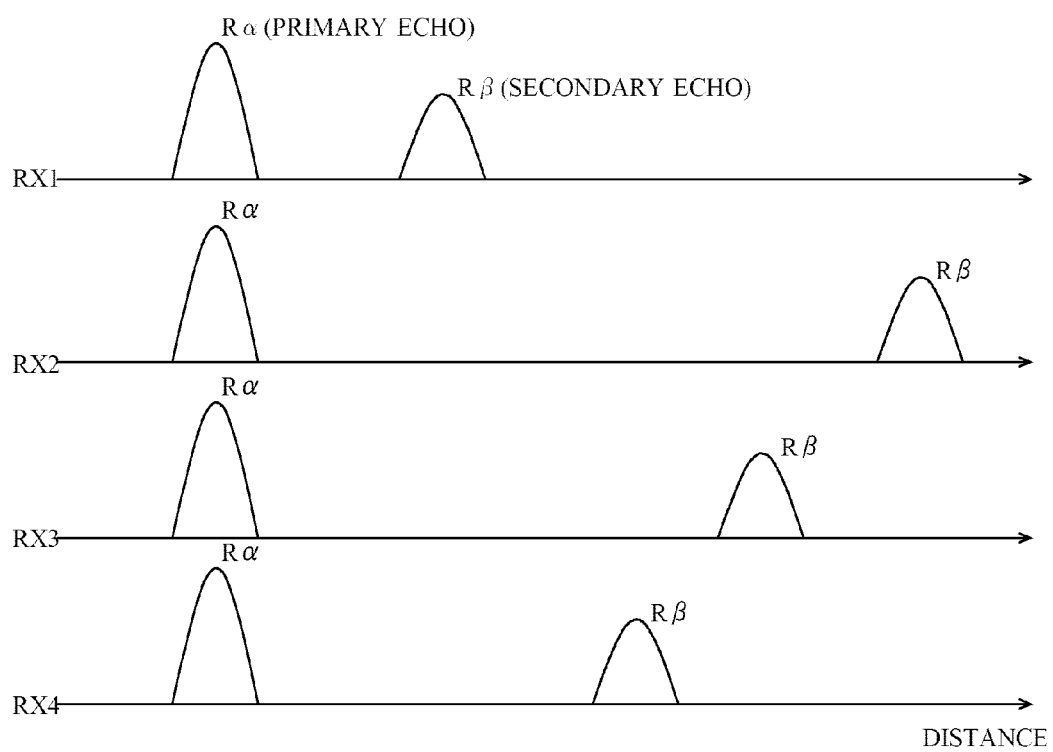
FIG. 3 is a diagram explaining the operation of the embodiment illustrated in FIG. 1.

The position of the secondary echo Rβ appearing in the pulse repetition cycle T2 is the time (RTb−T1) later after a timing when the transmission pulse is transmitted in the pulse repetition cycle T2. Similarly, positions of the secondary echoes Rβ appearing in the pulse repetition cycles T3, T4 are a time (RTb−T2) and a time (RTb−T3) later respectively after timings when the transmission pulses are transmitted in the pulse repetition cycles T3, T4. Further, a position of the secondary echo Rβ appearing in the pulse repetition cycle T1 of a second round and later is a time (RTb−T4) later after a timing when the transmission pulse is transmitted in the pulse repetition cycle T1. In this embodiment, the pulse repetition cycles T1 to T4 are set to, not T1=T2=T3=T4, but T1<T2<T3<T4. Therefore, (RTb−T1), (RTb−T2), (RTb−T3), and (RTb−T4) are different from each other, and thus the secondary echo Rβ is detected at a different distance every pulse repetition cycle, as illustrated in FIG. 3. Thus, the clutter removal unit 17, regarding the echo appearing at the different distance every pulse repetition cycle, judges to be the secondary echo and executes processing of removing. More specifically, the clutter removal unit 17 averages data of detection results illustrated in FIG. 3 to thereby make amplitudes of primary echoes (echoes from a target object existing within a detection region) existing at the same distance be constant and make amplitudes of the secondary echoes (echoes from a target object existing farther than the detection region) be decreased. Note that echoes of third-order or later can also be removed by similar processing. In other words, in this embodiment, multi-order echoes being echoes after secondary echo or later can be removed by similar processing.

As described hereinabove, in the embodiment of the present invention, different pulse repetition cycles T1 to T4 are set and the echo varying in distance is set to be removed as the multi-order echo, and thus it can be prevented to erroneously detect the multi-order echo as from the target object. Further, a sampling cycle of the signal received in the reception antenna RX1 is constant, i.e., T1+T2+T3+T4, and similarly, sampling cycles of the signals received in the reception antennas RX2 to RX4 are also constant, i.e., T1+T2+T3+T4. Therefore, since the sampling cycle is always constant, it is possible to prevent occurrence of uncertainty in speed in a DFT for detecting a Doppler speed of the target object.

Figure 4:
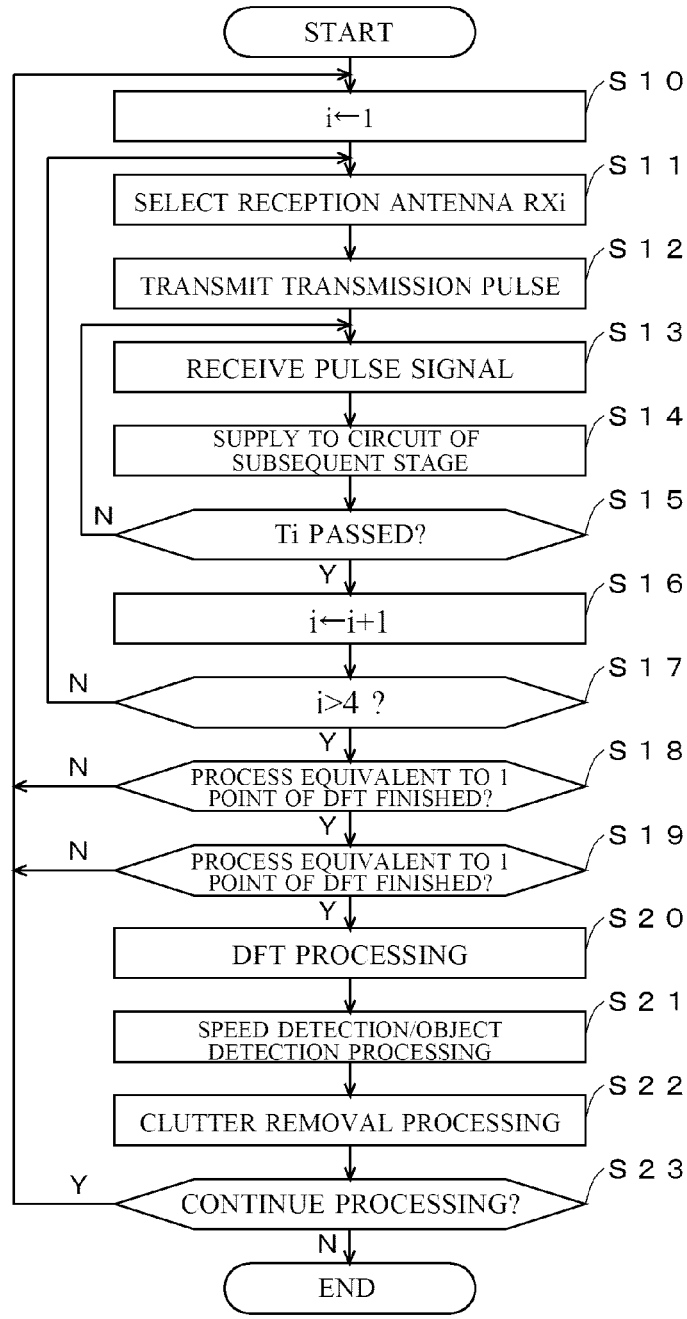
FIG. 4 is a flowchart explaining details of the operation of the embodiment illustrated in FIG. 1.

Next, details of the processing executed in the embodiment illustrated in FIG. 1 will be described with reference to FIG. 4. When the processing illustrated in FIG. 4 is started, the following steps are executed.

In a step S10, the control unit 11 substitutes an initial value 1 for a variable i for counting the number of processing.

In a step S11, the control unit 11 controls the reception signal switching unit 10 to select a reception antenna RXi. For example, in a case of i=1, the reception signal switching unit 10 selects the reception antenna RX1.

In a step S12, the control unit 11 controls the transmission unit 12 to transmit a transmission pulse. For example, in a case where a present moment is a timing t1, the transmission pulse is transmitted at the timing of t1 as illustrated in FIG. 2.

In a step S13, the reception unit 14 receives a pulse signal reflected by a target object. For example, in a case of i=1, the pulse signal transmitted from the transmission antenna TX and reflected by the target object is received by the antenna RX1.

In a step S14, the pulse signal received by the reception antenna is supplied to a circuit of a subsequent stage. In more detail, the reception unit 14 demodulates the signal supplied from the reception signal switching unit 10 by a high frequency signal supplied from the oscillation unit 13, and supplies to the A/D conversion unit 15. The A/D conversion unit 15 converts the supplied signal into a digital signal by A/D conversion, and supplies to the speed detection/object detection unit 16.

In a step S15, the control unit 11 determines whether or not a pulse repetition cycle Ti has passed, and if it is determined that Ti has passed (step S15: Yes), the process proceeds to a step S16, and in other cases (step S15: No), the process returns to the step S13 and the processing similar to the aforementioned case is repeated. For example, in a case of i=1, the process returns to the step S13 and the similar processing is repeated until the pulse repetition cycle T1 illustrated in FIG. 2 passes.

In the step S16, the control unit 11 increments the value of the variable i for counting the number of processing by 1.

In a step S17, the control unit 11 determines whether or not the value of the variable i is larger than 4, and in a case where the value is larger than 4 (step S17: Yes), the process proceeds to a step S18, and in other cases (step S17: No), the process returns to the step S11 and the processing similar to the aforementioned case is repeated.

In the step S18, the control unit 11 determines whether or not processing equivalent to one point of the DFT is finished, and in a case where the processing equivalent to one point is finished (step S18: Yes), the process proceeds to a step S19, and in other cases (step S18: No), the process returns to the step S10 and the processing similar to the aforementioned case is repeated. For example, in a case where one point of the DFT is constituted by 16 pieces of data, determination is possible by whether or not the processing of the step S10 to the step S18 was repeated 16 times.

In the step S19, the control unit 11 determines whether or not the processing equivalent to all the points of DFT is finished, and in a case where the processing equivalent to all the points is finished (step S19: Yes), the process proceeds to a step S20, and in other cases (step S19: No), the process returns to the step S10 and the processing similar to that of the aforementioned case is repeated. For example, in a case where all the points of the DFT are constituted by 32 pieces of data equivalent to one point, determination is possible by whether or not the processing of the step S10 to the step 19 was repeated 32 times. Note that determination of the processing of the step S18 and the step S19 can be collectively done in one step.

In the step S20, the speed detection/object detection unit 16 executes DFT processing to the signals received by the reception antennas RX1 to RX4, respectively. In more detail, the speed detection/object detection unit 16 executes the DFT processing after carrying out integrating processing (pre-sum processing) of the received signal.

In a step S21, to the data obtained by the DFT processing, the speed detection/object detection unit 16 executes processing of detecting a speed and a position of the target object. Information regarding the speed and the position of the target object which have been detected as above is supplied to the clutter removal unit 17.

In a step S22, the clutter removal unit 17 executes a processing of removing clutter (multi-order echo). For example, the clutter removal unit 17 adds up and averages the signals received by the antennas RX1 to RX4 and subjected to the DFT processing. Thereby, since averaging does not decrease the value of the primary echo but decreases the value of the multi-order echo, the obtained value is compared with a threshold value and an object of the value equal to or less than the threshold value is removed, whereby the clutter can be removed.

In a step S23, the control unit 11 determines whether or not to continue the processing, and in a case of determining to continue the processing (step S23: Yes), the process returns to the step S10 and the processing similar to the aforementioned case is executed, and in other cases (step 23: No), the processing ends.

According to the above processing, it is possible to prevent the multi-order echo from being erroneously detected as from the target object. Further, since the sampling cycle is always constant, it is possible to prevent uncertainty in speed from occurring in the DFT where the Doppler speed of the target object is detected.

(C) Explanation of Configuration of Second Embodiment of Present Invention

Figure 8:
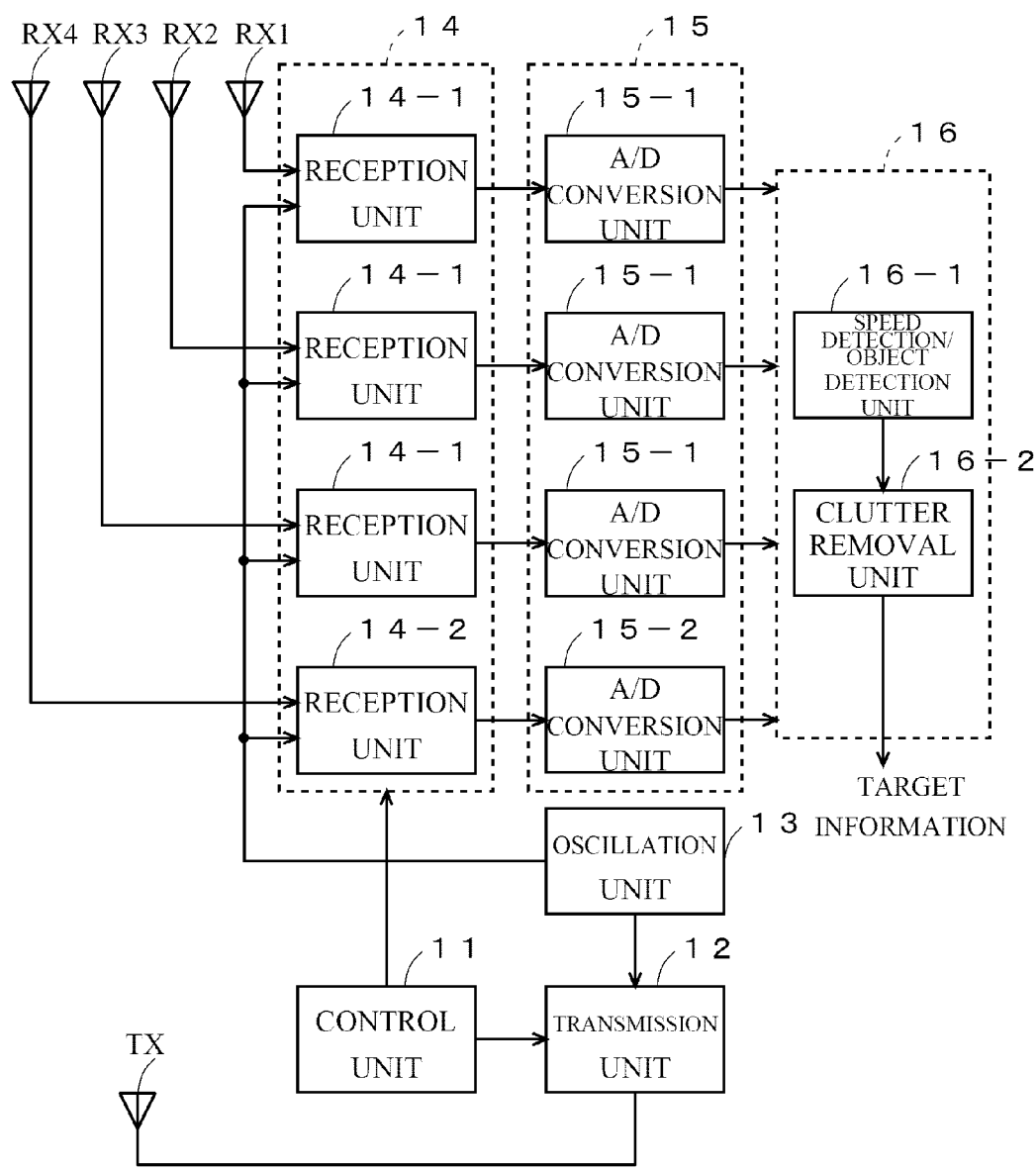
FIG. 8 is a diagram illustrating a configuration example of a radar apparatus according to an embodiment of the present invention.

FIG. 8 is a block diagram illustrating a configuration example of a radar apparatus according to a second embodiment of the present invention. As illustrated in FIG. 8, major components of the radar apparatus according to the second embodiment of the present invention are a transmission antenna TX, reception antennas RX1 to RX4, a control unit 11, a transmission unit 12, an oscillation unit 13, a reception unit group 14, an A/D (Analog to Digital) conversion unit group 15, and a signal processing unit 16. Note that the radar apparatus according to this embodiment will be explained by exemplifying a case where the radar apparatus is mounted on a vehicle such as an automobile and operated as an apparatus to detect another vehicle, an obstacle, a pedestrian, or the like, for example. It is a matter of course that the radar apparatus can be equipped to a movable body other than the vehicle.

Here, the transmission antenna TX is an antenna which transmits a pulse signal supplied from the transmission unit 12 to a target object as a radio wave. The reception antennas RX1 to RX4 are antennas which receive the radio waves transmitted from the transmission antenna TX and reflected by the target object and supplies to the reception unit group 14 as radio waves.

The control unit 11 controls the transmission unit 12 to output the pulse signal at a predetermined timing and controls the reception unit group 14 to supply the signals received by the reception antennas RX1 to RX4 to the A/D conversion unit group 15.

The transmission unit 12 modulates a high frequency signal supplied from the oscillation unit 13 in correspondence with the control of the control unit 11, and generates a high frequency pulse signal, to radiate into space via the transmission antenna TX.

The oscillation unit 13 oscillates at a predetermined frequency to supply the obtained high frequency signal (local signal) to the reception unit group 14 and the transmission unit 12.

The reception unit group 14 is constituted by reception units 14-1 to 14-4 and demodulates the reception signals supplied from the reception antennas RX1 to RX4 respectively by the high frequency signal supplied from the oscillation unit 13, to supply to the A/D conversion unit 15.

The A/D conversion unit group 15 is constituted by A/D conversion units 15-1 to 15-4 and samples the signals supplied from the reception units 14-1 to 14-4 respectively at a predetermined frequency and converts into digital signals by A/D conversion, to supply to the signal processing unit 16.

The signal processing unit 16 has a distance/speed detection unit 16-1 and an interference wave removal unit 16-2. The distance/speed detection unit 16-1 executes, to the digital signal supplied from the A/D conversion unit 15, processing of pre-summing and DFT (Discrete Fourier Transform) and so on, and carries out speed detection of the reception signal, to detect the target object from information of a Doppler frequency and information of a distance of an object. The interference wave removal unit 16-2 executes processing of removing an interference wave from object detection information supplied from the distance/speed detection unit 16-1.

(D) Explanation of Operation of Second Embodiment of Present Invention

Figure 9:
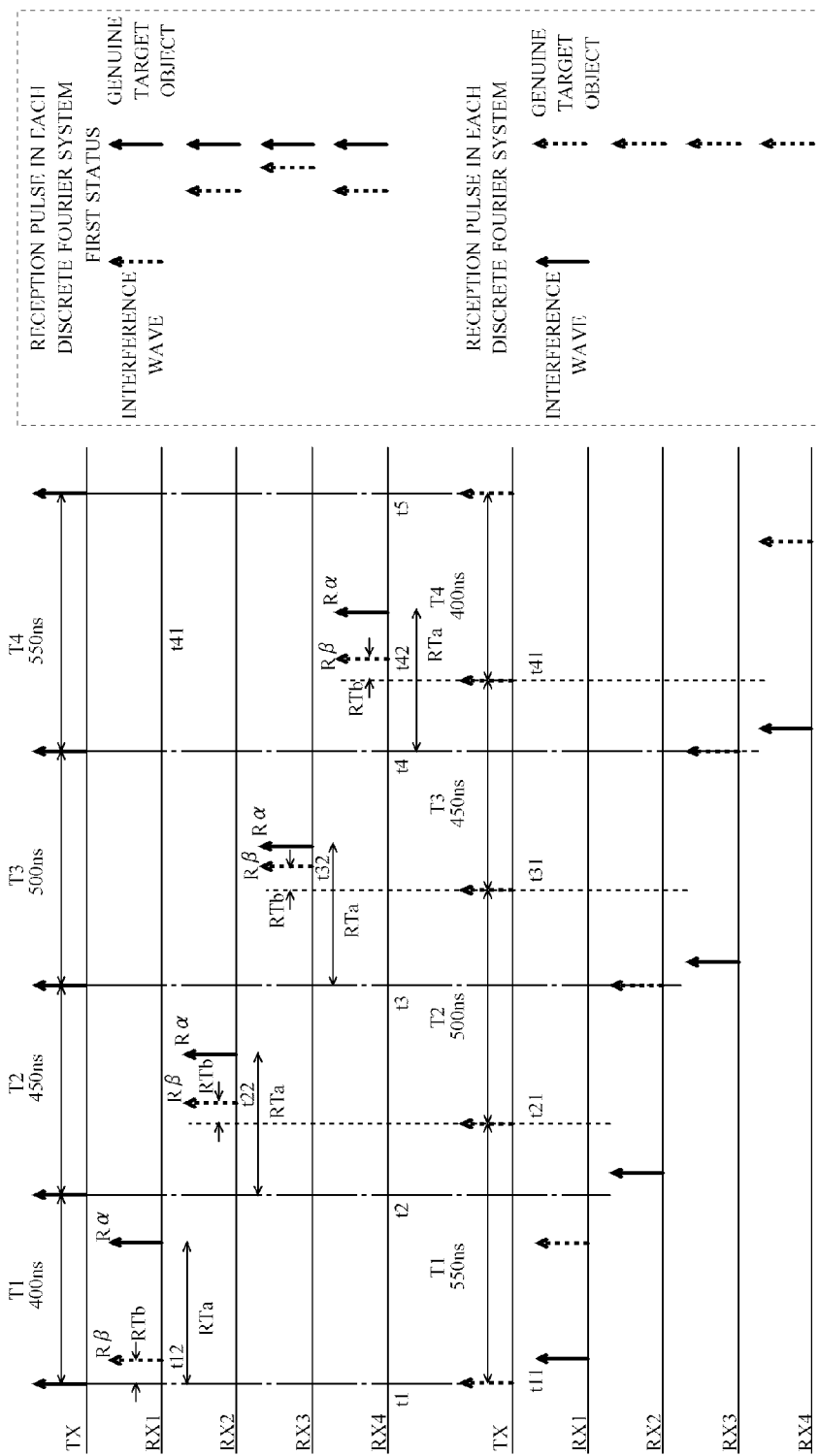
FIG. 9 is a diagram explaining an operation of the embodiment illustrated in FIG. 8.

Next, an operation of the second embodiment of the present invention will be described. FIG. 9 is a timing chart explaining an operation of the second embodiment illustrated in FIG. 8. Note that in FIG. 9, a horizontal axis indicates a time, while TX in a vertical axis indicates a pulse signal transmitted from the transmission antenna TX and RX1 to RX4 indicate pulse signals received by the reception antennas RX1 to RX4. Further, a radar apparatus A indicates a radar apparatus illustrated in FIG. 8 and a radar apparatus B indicates another radar apparatus which becomes a source of generation of an interference wave.

For example, when an ignition key of a vehicle on which the radar apparatus illustrated in FIG. 8 is mounted is turned on, a not-illustrated ECU (Electric Control Unit) instructs the control unit 11 of the radar apparatus illustrated in FIG. 8 to start an operation. As a result, the control unit 11 controls the transmission unit 12 to transmit a pulse signal at a predetermined cycle and controls the reception unit group 14 to receive a reflection wave by any one of the reception units 14-1 to 14-4. In more detail, the control unit 11, as illustrated in FIG. 9, at a timing t1, controls the transmission unit 12 to transmit a transmission pulse (pulse indicated by a heavy line arrow in FIG. 9) and makes the reception unit 14-1 operate. When a pulse repetition cycle T1 (=400 ns) passes since transmission of the transmission pulse, the control unit 11, at a timing t2, controls the transmission unit 12 to transmit a transmission pulse and makes the reception unit 14-2 operate. Further, when a pulse repetition cycle T2 (=450 ns) passes since transmission of the transmission pulse, the control unit 11, at a timing t3, controls the transmission unit 12 to transmit a transmission pulse and makes the reception unit 14-3 operate. Similarly, when a pulse repetition cycle T3 (=500 ns) passes since transmission of the transmission pulse, the control unit 11, at a timing t4, controls the transmission unit 12 to transmit a transmission pulse and makes the reception unit 14-4 operate. Then, when a pulse repetition cycle T4 (=550 ns) passes since transmission of the transmission pulse, the control unit 11, at a timing t5, controls the transmission unit 12 to transmit a transmission pulse and makes the reception unit 14-1 operate, and thereafter, similarly, there is repeated the operation of transmitting the transmission pulse after passage of the pulse repetition cycle T1 (=400 ns) and making the reception unit 14-1 operate and transmitting the transmission pulse after passage of the pulse repetition cycle T2 (=450 ns) and making the reception unit 14-2 operate. As a result, as illustrated in FIG. 9, the pulse signals are transmitted in the pulse repetition cycles T1 to T4.

The transmission pulse transmitted from the transmission antenna TX at the timing t1 is reflected by the target object, received by the reception antenna RX1, and supplied to the reception unit 14-1. When a time from transmission of the transmission pulse, through reflection by the target object, until reception by the reception antenna RX1 is referred to as RTa, as illustrated in FIG. 9, an echo Rα is received the time RTa later after the transmission pulse is transmitted. Note that since the pulse repetition cycle is quite short (a few hundreds ns), a distance between the vehicle on which the radar apparatus is mounted and the target object hardly changes during that time, and thus, also in any pulse repetition cycle, the echo Rα is received after the time RTa passes since transmission of the transmission pulse.

The reception units 14-1 to 14-4 demodulate the reception signals supplied from the reception antennas RX1 to RX4 by the high frequency signal supplied from the oscillation unit 13 and then output. The A/D conversion units 15-1 to 15-4 convert the demodulated signals supplied from the reception units 14-1 to 14-4 respectively into digital signals and then output. The distance/speed detection unit 16-1 applies integrating processing, DFT processing, and so on to the digital signals supplied from the A/D conversion units 15-1 to 15-4, to detect a distance and a speed of the target object. Then, the distance and the speed of the target object is output as target information after processing (details will be described later) of removing an interference wave is executed by the interference wave removal unit 16-2.

Incidentally, if a radar apparatus B being an interference source exists, the radar apparatus A receives a pulse signal transmitted from the radar apparatus B. For example, when the radar apparatus B, as illustrated in FIG. 9, transmits a pulse signal at a timing indicated by a heavy broken line arrow, the radar apparatus A receives the pulse signal transmitted from the radar apparatus B as a reception signal Rβ at a timing delayed by a time RTb corresponding to a distance to the radar apparatus B. The reception signal Rβ as above may be erroneously detected as a reflection wave from the target object and is required to be removed.

In the example illustrated in FIG. 9, pulse repetition cycles T1 to T4 of the radar apparatus B are 550 ns, 500 ns, 450 ns, and 400 ns, which are different from the pulse repetition cycles of the radar apparatus A. In such a case, as illustrated in a broken line rectangle of FIG. 9, a reception signal (signal indicated by a broken line arrow in FIG. 9) from the radar apparatus B appears at a different distance every pulse repetition cycle, while a signal from a genuine detection target object always appears at a constant distance.

Thus, in this embodiment, the signal appearing at a different distance every pulse repetition cycle among the reception signals is determined to be an interference wave from the interference source and the interference wave removal unit 16-2 removes that signal. In more detail, the interference wave removal unit 16-2 averages the signals of the respective pulse repetition cycles. Thereby, while a value of the reflection signal from the genuine detection target object is kept constant, a value of the interference wave is decreased by averaging, resulting in that the interference wave can be removed.

Figure 10:
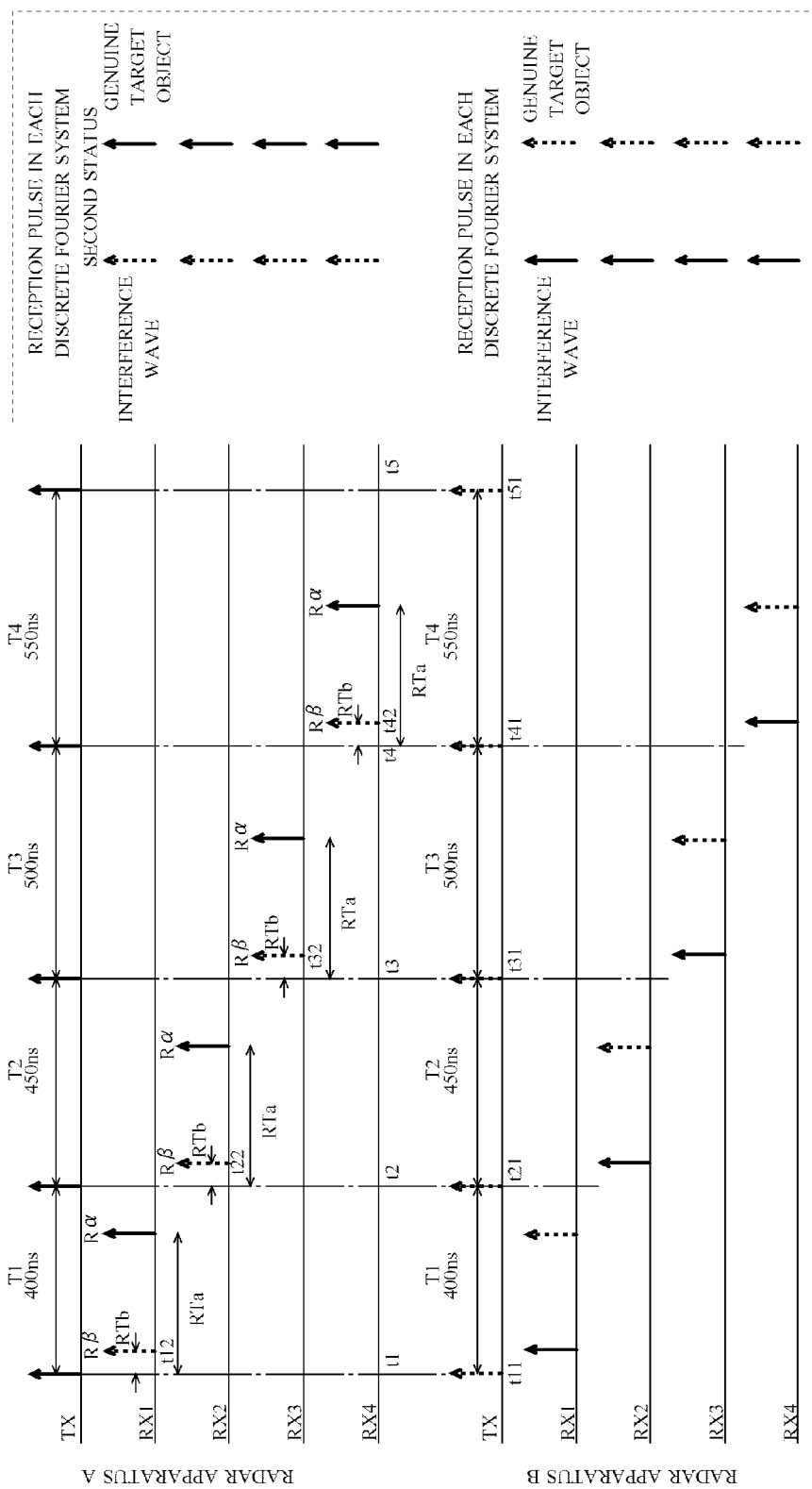
FIG. 10 is a diagram explaining the operation of the embodiment illustrated in FIG. 8.

Meanwhile, FIG. 9 is an example of a case where the pulse repetition cycles of the radar apparatus A and the radar apparatus B are different from each other, and a status of a case where the pulse repetition cycles of the radar apparatus A and the radar apparatus B are the same is as illustrated in FIG. 10. In an example of FIG. 10, the pulse repetition cycles T1 to T4 of both radar apparatus A and radar apparatus B are 400 ns, 450 ns, 500 ns, and 550 ns, and in this example, the transmission timings also coincide. When the pulse repetition cycles are the same, a reflection wave from the genuine detection target object and an interference wave appear at the same distance as indicated inside a rectangular broken line, and thus the interference wave cannot be removed by averaging.

Thus, in this embodiment, transmission of the pulse signal is temporarily halted, and in a case where the reception signal exists in that occasion, it is determined that an interference source exists. Then, if the interference wave exists, a pulse signal is transmitted at a predetermined pulse repetition cycle and it is determined whether the reception signal is in a status of FIG. 9 (hereinafter, referred to as a "first status") or in the status of FIG. 10 (hereinafter, referred to as a "second status"). In a case of the first status, since the pulse repetition cycle of the interference source and the pulse repetition cycle of the apparatus itself are different, the interference wave can be removed by the aforementioned processing, and thus the processing is continued. Meanwhile, in a case of the second status illustrated in FIG. 10, the interference wave cannot be removed, and thus, in such a case, setting of the pulse repetition cycle is altered to thereby bring about the first status. In more detail, the order of the pulse repetition cycles is altered or lengths of respective pulse repetition cycles are altered, to thereby bring about the first status. Whether or not the first status is brought about can be determined by, with pulse signals being transmitted, whether or not distances of the interference waves included in the reception signals change. Then, when the first status is brought about, the operation shifts to a normal operation.

As described above, according to the embodiment of the present invention, the pulse repetition cycles are set to be different so that the target object appearing at different distances every pulse repetition cycle, if detected, may be removed as the interference wave from the interference source, and thus, for example, it is possible to prevent a transmission pulse from another radar apparatus mounted on a vehicle of its own or another vehicle from being erroneously detected as from the target object. Further, transmission of the pulse signal is halted, and, in a case where the reception signal exists at that time, it is determined that the interference source exists, the pulse repetition cycle being altered to bring about the first status, and so on, whereby influence from the radar apparatus of the same kind can be surely prevented.

Figure 11:
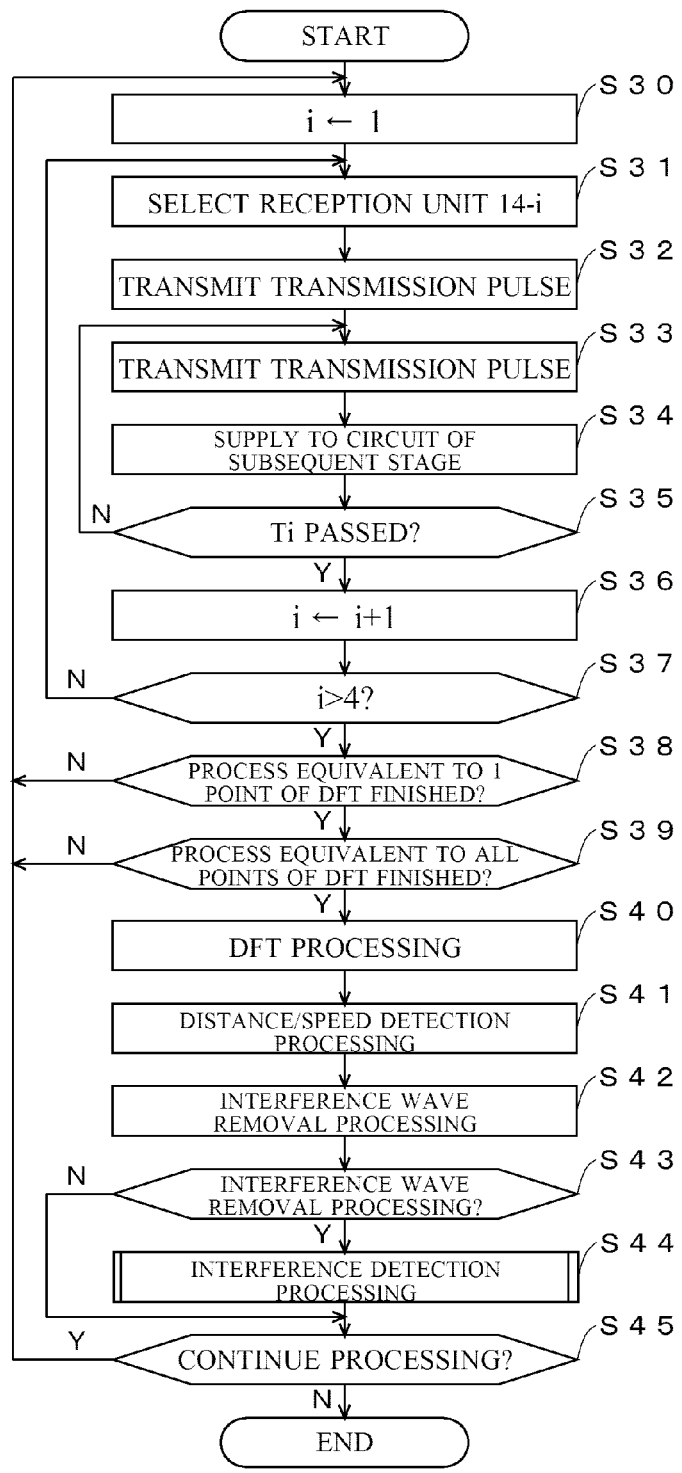
FIG. 11 is a flowchart explaining details of the operation of the embodiment illustrated in FIG. 8.

Next, details of the processing executed in the embodiment illustrated in FIG. 8 will be described with reference to FIG. 11. When processing illustrated in FIG. 11 is started, the following steps are executed.

In a step S30, the control unit 11 substitutes an initial value 1 for a variable i for counting the number of processing.

In a step S31, the control unit 11 makes the reception unit 14-*i* operate. For example, in a case of i=1, the reception unit 14-1 is made to operate.

In a step S32, the control unit 11 controls the transmission unit 12 to transmit a transmission pulse. For example, in a case where a present moment is a timing t1, the transmission pulse is transmitted at a timing of t1 as illustrated in FIG. 9.

In a step S33, the reception unit 14-*i* receives a pulse signal reflected by a target object. For example, in a case of i=1, the pulse signal transmitted from the transmission antenna TX and reflected by the target object is received by the antenna RX1 and supplied to the reception unit 14-1.

In a step S34, the received pulse signal is supplied to a circuit of a subsequent stage. For example, in the case of i=1, the reception unit 14-1 demodulates the signal supplied from the reception antenna RX1 by a high frequency signal supplied from the oscillation unit 13, and supplies to the A/D conversion unit 15-1. The A/D conversion unit 15-1 converts the supplied signal into a digital signal by A/D conversion, and supplies to the distance/speed detection unit 16-1.

In a step S35, the control unit 11 determines whether or not a pulse repetition cycle Ti has passed, and if it is determined that Ti has passed (step S35: Yes), the process proceeds to a step S36, and in other cases (step S35: No), the process returns to the step S33 and the processing similar to the aforementioned case is repeated. For example, in the case of i=1, the process returns to the step S33 and the similar processing is repeated until the pulse repetition cycle T1 illustrated in FIG. 9 passes. Note that, for example, the pulse repetition cycle is stored in a semiconductor memory device, and the cycle corresponding to the variable i is acquired from the semiconductor memory device, and it can be judged based on this cycle.

In the step S36, the control unit 11 increments the value of the variable i for counting the number of processing by 1.

In a step S37, the control unit 11 determines whether or not the value of the variable i is larger than 4, and in a case where the value is larger than 4 (step S37: Yes), the process proceeds to a step S38, and in other cases (step S37: No), the process returns to the step S31 and the processing similar to the aforementioned case is repeated.

In a step S38, the control unit 11 determines whether or not processing equivalent to one point of the DFT is finished, and in a case where the processing equivalent to one point is finished (step S38: Yes), the process proceeds to a step S39, and in other cases (step S38: No), the process returns to the step S30 and the processing similar to the aforementioned case is repeated. For example, in a case where one point of the DFT is constituted by 16 pieces of data, determination is possible by whether or not the processing of the step S30 to the step S18 was repeated 16 times.

In a step S39, the control unit 11 determines whether or not the processing equivalent to all the points of DFT is finished, and in a case where the processing equivalent to all the point is finished (step S39: Yes), the process proceeds to a step S40, and in other cases (step S39: No), the process returns to the step S30 and the processing similar to that of the aforementioned case is repeated. For example, in a case where all the points of the DFT are constituted by 32 pieces of data equivalent to one point, determination is possible by whether or not the processing of the step S30 to the step 19 was repeated 32 times. Note that determination of the processing of the steps S38 and the step S39 can be collectively done by one step.

In the step S40, the distance/speed detection unit 16-1 executes DFT processing to the signals received by the reception antennas RX1 to RX4, respectively. In more detail, the distance/seed detection unit 16-1 executes the DFT processing after carrying out integrating processing (pre-sum processing) of the received signal.

In a step S41, to the data obtained by the DFT processing, the distance/speed detection unit 16-1 executes processing of detecting a distance and a speed of the target object. Information regarding the distance and the speed of the target object which have been detected as above is supplied to the interference wave removal unit 16-2.

In a step S42, the interference wave removal unit 16-2 executes processing of removing an interference wave. For example, the interference wave removal unit 16-2 adds up and averages the signals which are received by the antennas RX1 to RX4 and subjected to the DFT processing. Thereby, since averaging does not decrease a value of an echo from the genuine target object but decreases a value of the interference wave, the obtained value is compared with a threshold value and an object of a value equal to or less than the threshold value is removed, whereby the interference wave can be removed.

In a step S43, the control unit 11 determines whether or not to execute interference detection processing, and in a case of determining to execute the processing (step S43: Yes), the process proceeds to a step S44, and in other cases (step 43: No), the process proceeds to a step S45. Note that the interference detection processing is, as will be described later, processing of determining whether or not an interference source exists and setting to bring about the first status (status where the interference wave can be removed) illustrated in FIG. 9 in a case where the interference source exists. Note that as a criterion of judgement of whether or not to execute the interference detection processing, for example, it can be judged by whether or not a predetermined time has passed since the processing was executed previously.

In the step S44, the control unit 11 executes the interference detection processing. Note that details of this processing will be described later with reference to FIG. 12.

In the step S45, the control unit 11 determines whether or not to continue the processing, and in a case of determining to continue the processing (step S45: Yes), the process returns to the step S30 and the processing similar to the aforementioned case is executed, and in other cases (step 45: No), the processing ends.

Figure 12:
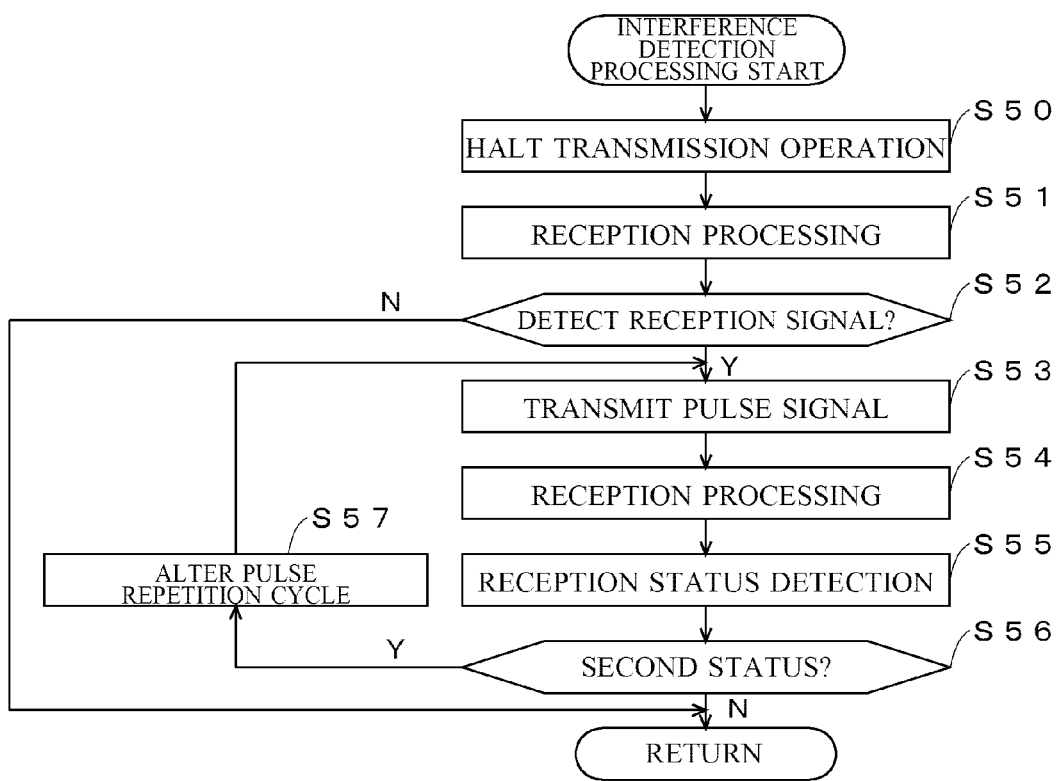
FIG. 12 is a flowchart explaining details of an "interference detection processing" illustrated in FIG. 11.

Next, details of the "interference detection processing" illustrated in FIG. 11 will be described with reference to FIG. 12. When processing illustrated in FIG. 12 is started, the following steps are executed.

In a step S50, the control unit 11 controls the transmission unit 12 to halt a transmission operation. As a result, transmission of the pulse signal from the transmission antenna TX is halted.

In a step S51, the control unit 11 controls the reception unit group 14 to execute reception processing. As a result, when an interference source exists, a transmission signal from the interference source is received.

In a step S52, the control unit 11 determines whether or not the reception signal is detected by the reception processing in the step S51, and when it is determined that the reception signal is detected (step S52: Yes), the process proceeds to a step S53, and in other cases (step S52: No), the process returns to the original processing.

In the step S53, the control unit 11 controls the transmission unit 12 to transmit a pulse signal at a pulse repetition cycle which is set presently, for example. As a result, the pulse signal is transmitted from the transmission antenna TX. For example, the pulse signal is transmitted based on the pulse repetition cycles T1 to T4 illustrated in FIG. 9.

In a step S54, the control unit 11 controls the reception unit group 14 to execute the reception processing. For example, the pulse signal is received by the reception unit group 14 based on the pulse repetition cycles T1 to T4 illustrated in FIG. 9.

In a step S55, the control unit 11 detects a reception status. In more detail, the control unit 11 inquires of the signal processing unit 16 the reception status to thereby specify whether the reception status is the first status or the second status.

In a step S56, the control unit 11 determines whether or not the reception status is the second status, and if the reception status is determined to be the second status (is the status of FIG. 10) (step S56: Yes), the process proceeds to a step S57, and in other cases, the process returns to the former processing. For example, if the reception status is determined to be the second status, the process proceeds to the step S57.

In the step S57, the control unit 11 executes processing of altering the pulse repetition T1 to T4. For example, the processing of altering the order of the pulse repetition T1 to T4 or altering lengths of the respective pulse repetition cycles is executed. Note that the pulse repetition cycles altered as the above are stored in a semiconductor memory device, for example. Then, the process returns to the processing of the step S53 and the processing similar to the aforementioned case is repeated.

According to the processing illustrated in FIG. 12, the transmission operation is halted, and if the reception signal exists, it is determined that the interference source exists and the pulse repetition cycle can be set appropriately so as to bring about the first status (status illustrated in FIG. 9) where the interference wave can be removed.

(E) Explanation of Modified Embodiment

The aforementioned embodiments are merely examples and it goes without saying that the present invention is not limited only to the aforementioned cases. For example, in the above first embodiment, the pulse repetition cycles are set to four kinds of T1 to T4, but the pulse repetition cycles may be set to three kinds or less or five kinds or more.

Further, in the above first embodiment, all the pulse repetition cycles T1 to T4 were set to be different, but it is possible to set at least one pulse repetition cycle is different from the others. It is a matter of course that the value decreases more by averaging when all the pulse repetition cycles are different, but detection is also possible when only one is different. Note that in the first embodiment, when one pulse repetition cycle is different, a multi-order echo is detected in a period subsequent thereto, and thus it is possible to judge an echo as the multi-order echo if the echo exists at a distance different from that in another period, in the period subsequent to the different pulse repetition cycle. Further, in the second embodiment, when one repetition cycle is different, a signal detected after a pulse signal transmitted at a different timing is in a status different from others in terms of distance, and thus an interference wave can be removed by detecting such a signal.

Further, in the first embodiment hereinabove, the pulse repetition cycles T1 to T4 which were set to have longer cycles in this order may be set to have shorter cycles in this order. Further, instead of being arranged in descending order or ascending order, the pulse repetition cycles may be arranged at random.

Further, a difference value of lengths of the pulse repetition cycles T1 to T4 may be set to a difference value which makes a movement amount of an interference wave or multi-order echo be equal to or more than a detection limit. For example, in an example of T1 and T2, when it is set to $|T1-T2|=\Delta T$, it suffices that T1 and T2 are set to make $\Delta T$ be equal to or more than the detection limit of a radar apparatus. For example, when a distance resolution is 60 cm, it suffices that ΔT is set to be a time difference equal to or more than about 4 ns, but in practice, it is desirable to adjust the time difference in accordance with a transmission width, a size (or length) of an assumed target object, or a size of a reflection point. Note that the same applies also to T3 and T4.

Figure 5:
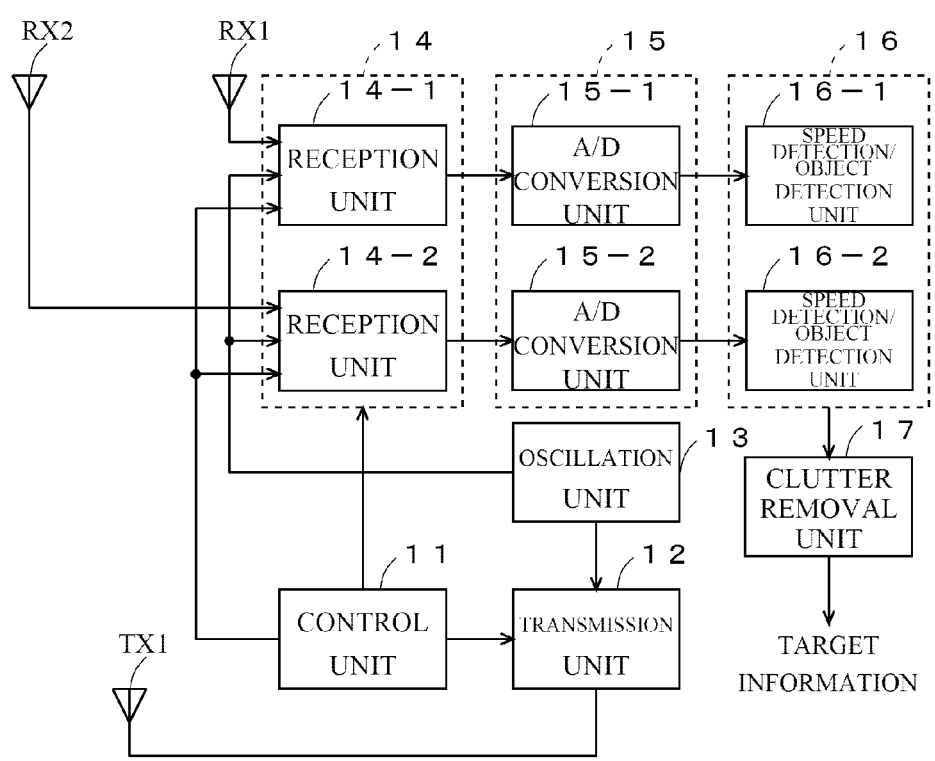
FIG. 5 is a diagram illustrating a modified embodiment of the present invention.
Figure 13:
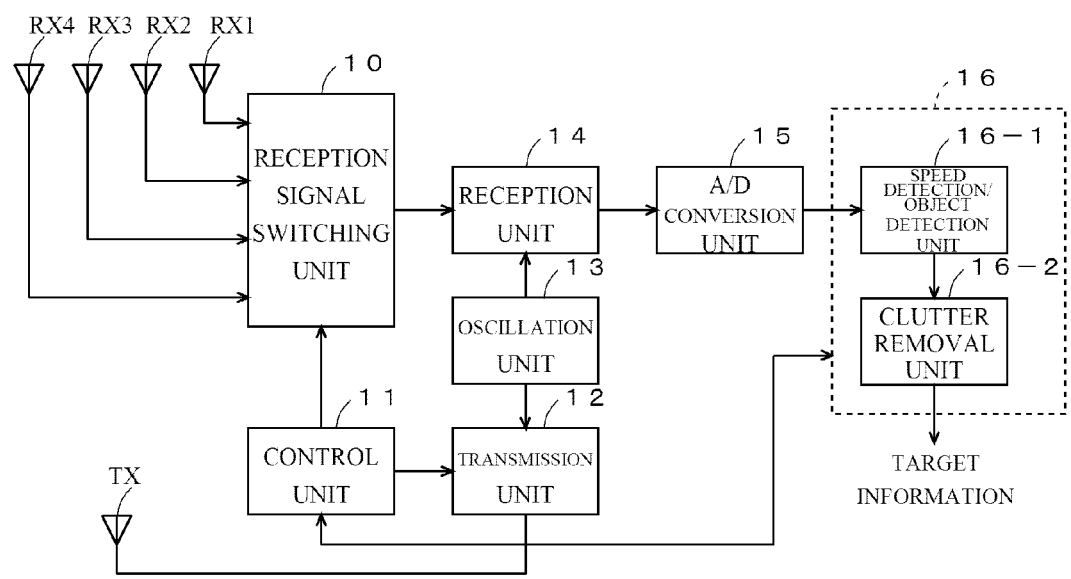
FIG. 13 is a diagram illustrating a modified embodiment of the present invention.

Further, in the embodiment illustrated in FIG. 1, the radar apparatus has four reception antennas RX1 to RX4, but the number of reception antennas may be the number other than the above. For example, the radar apparatus may have only one reception antenna or may have two reception antennas as illustrated in FIG. 5. Further, in the embodiment illustrated in FIG. 1, the four reception antennas RX1 to RX4 are used by being switched by the reception signal switching unit 10, but it is possible that one or two reception antenna(s) is (are) used without being switched. In the embodiment illustrated in FIG. 5, the radar apparatus has two reception antennas RX1, RX2, and has two reception units 14-1, 14-2, two A/D conversion units 15-1, 15-2, and two speed detection/object detection units 16-1, 16-2. In the embodiment illustrated in FIG. 5, the reception units 14-1, 14-2 can carry out reception alternately by control of the control unit 11. A multi-order echo can be removed also by such a configuration. Note that though in FIG. 5, the radar apparatus has two reception units 14-1, 14-2, A/D conversion units 15-1, 15-2 and speed detection/object detection units 16-1, 16-2, it goes without saying that the number may be the number other than the above. Further, in the embodiment illustrated in FIG. 8, the radar apparatus has four reception units 14-1 to 14-4, but the four reception antennas may be used by being switched by the reception signal switching unit 10 as illustrated in FIG. 13. In the embodiment illustrated in FIG. 13, the radar apparatus has four reception antennas RX1 to RX4 and has one reception unit 14-1 and one A/D conversion unit 15, and supplies the reception signal to the reception unit 14 by controlling the reception signal switching unit 10 by the control unit 11 to select any one of the reception antennas RX1 to RX4. An interference wave can be removed also by such a configuration.

Figure 6:
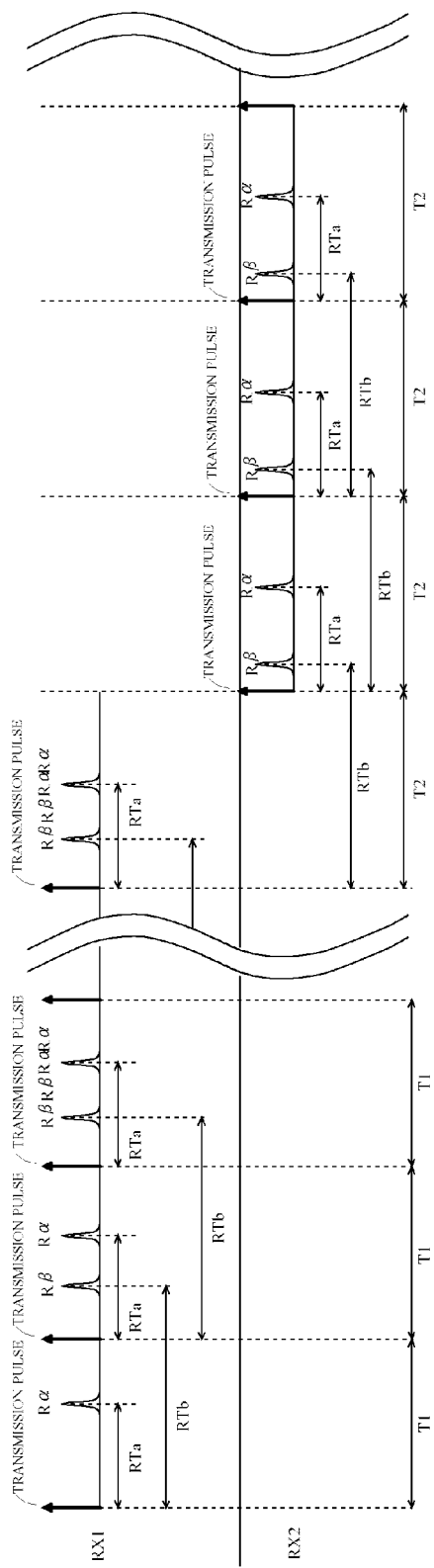
FIG. 6 is a diagram explaining an operation of the embodiment illustrated in FIG. 5.
Figure 7:
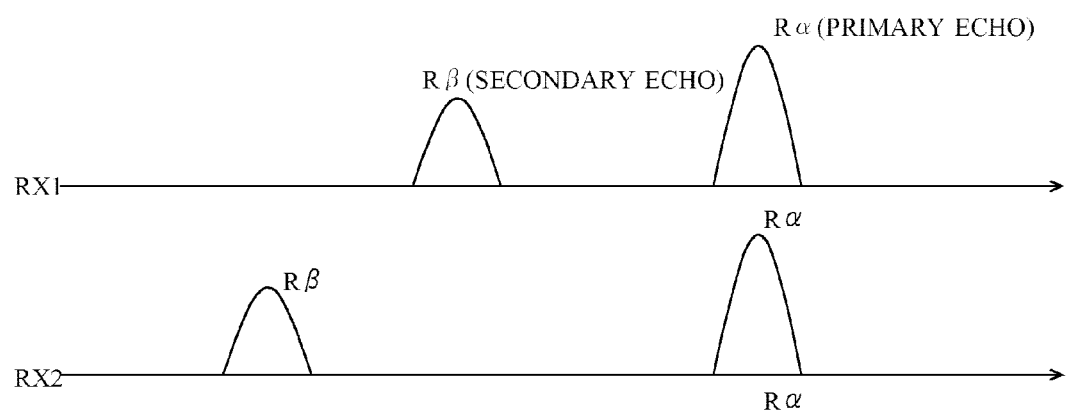
FIG. 7 is a diagram explaining the operation of the embodiment illustrated in FIG. 5.

Further, in the example illustrated in FIG. 2, the pulse repetition cycles were set to be in the order of T1, T2, T3, and T4, but T1 may be executed repeatedly a predetermined times (integral times) and T2 may be executed if T1 ends, for example, as illustrated in FIG. 6. Note that though only T1, T2 are illustrated in FIG. 6, T3, T4 may also be executed. FIG. 7 is a diagram illustrating relation between a primary echo and a secondary echo in a case illustrated in FIG. 6. In this example, the primary echoes Rα appear at the same position in both reception antennas RX1, RX2, while the secondary echoes Rβ appear at different positions in the reception antennas RX1, RX2. As a result, a multi-order echo can be removed also by a method illustrated in FIG. 6. Further, in the example illustrated in FIG. 9, the pulse repetition cycles were set to be in the order of T1, T2, T3, and T4, but, for example, T1 may be executed repeatedly a predetermined times (integral times) and T2 may be similarly executed if Ti ends, and thereafter, T3, and T4 may be similarly executed. An interference wave may be removed also by such a method.

Further, in the first embodiment hereinabove, by averaging the signals of the different pulse repetition cycles, a multi-order echo component was decreased compared with a primary echo component, but for example, by referring to data of the DFT processing result and, in a case where mismatching of data occurs among the reception antennas (for example, in a case where an echo exists at a predetermined position in the reception antenna RX1 but echoes do not exist at the same position in the reception antennas RX2 to RX4), that echo may be removed as a multi-order echo. Further, in the second embodiment, by averaging signals of different pulse repetition cycles, the interference wave was decreased compared with the signal from the genuine detection target object, but, for example, by referring to data of the DFT processing result and, in a case where mismatching of data occurs among the reception antennas (for example, in a case where a reception signal exists at a predetermined position in the reception antenna RX1 but reception waves do not exist at the same position in the reception antennas RX2 to RX4), that reception wave may be removed as an interference wave.

EXPLANATION OF REFERENCE SIGNS

TX transmission antenna
RX1 to RX4 reception antennas
10 reception signal switching unit
11 control unit (setting means)
12 transmission unit
13 oscillation unit
14 reception unit group
14-1 to 14-4 reception units
15 A/D conversion unit group
15-1 to 15-4 A/D conversion units
16 signal processing unit
16-1 distance/speed detection unit (detection means)
16-2 interference wave removal unit (removal means)
17 clutter removal unit

The invention claimed is:

1. A radar apparatus transmitting pulse signals at predetermined repetition cycles and receiving and analyzing the pulse signals reflected by a target object to thereby detect the target object, the radar apparatus comprising:
    a transmitting antenna for transmitting the pulse signals at the repetition cycles of T1 to Tn where n is greater than 1;
    a plurality of receiving antennas for receiving each of the pulse signals of the repetition cycles of T1 to Tn reflected by the target object;
    a detecting means for detecting a distance to the target object by performing predetermined processing on each of the pulse signals received by the plurality of receiving antennas;
    a setting means for setting at least a part of the repetition cycles of T1 to Tn to be different, and for setting a total time of the repetition cycles of T1 to Tn as a constant sampling period; and
    a removal means for removing the target object as an interference wave from another radar apparatus or clutter when the distance to the target object, detected in a repetition cycle of the repetition cycles or in a period subsequent to the repetition cycle by the detecting means and another distance to the target object detected in another period other than that by the detecting means are different.

2. The radar apparatus according to claim 1, wherein
    the setting means sets so that at least one part of the repetition cycles of the pulse signals is different from a part other than the at least one part of the repetition cycles of the pulse signals, and so that a sampling cycle for sampling the pulse signal is constant, and
    the removal means removes the target object as the clutter when the distance to the target object detected in the period subsequent to the at least one part of the repetition cycles by the detecting means and the another distance to the target object detected in the another period other than the period subsequent to the at least one part of the repetition cycles by the detecting means are different.

3. The radar apparatus according to claim 2, wherein the setting means sets so that all the repetition cycles of the plurality of pulse signals existing in the sampling cycle are different.

4. The radar apparatus according to claim 2, wherein the setting means sets the repetition cycles with a unit being the pulse signals being repeated a predetermined times at the same repetition cycles, and sets so that the repetition cycle of at least a part of unit among the plurality of units is different.

5. The radar apparatus according to claim 2, wherein the removal means averages a detection signal in the repetition cycle and a another detection signal in the repetition cycle to thereby make a clutter component relatively small.

6. The radar apparatus according to claim 2, wherein the removal means removes the detection signal only in the predetermined repetition cycle as the clutter.

7. The radar apparatus according to claim 1, wherein the setting means sets so that at least one part of the repetition cycles of the pulse signals is different from a part other than the at least one part of the repetition cycles of the pulse signals, and
the removal means removes the target object as the interference wave from the another radar apparatus when the distance to the target object detected in the at least one part of the repetition cycles of the pulse signals by the detecting means and the another distance to the target object detected in the another period other than the at least one part of the repetition cycles by the detection detecting means are different.

8. The radar apparatus according to claim 7, wherein the setting means sets so that at least one repetition cycle of the plurality of pulse signals existing in the sampling cycle is different.

9. The radar apparatus according to claim 8, wherein the setting means sets so that all the repetition cycles of the plurality of pulse signals existing in the sampling cycle are different.

10. The radar apparatus according to claim 7, wherein the setting means sets the repetition cycles with a unit being the pulse signals continuing a predetermined times at the same repetition cycles, and sets so that the repetition cycle of at least a part of unit among the plurality of units is different.

11. The radar apparatus according to claim 7, wherein the setting means sets the repetition cycle so that an interference source may be determined to exist in a case where a reception signal exists in a status where transmission of the pulse signal is halted, and so that the reception signal can be removed by the removal means.

12. The radar apparatus according to claim 7, wherein the removal means averages a detection signal in the repetition cycle and another detection signal in the repetition cycle to thereby make an interference wave component relatively small.

13. The radar apparatus according to claim 7, wherein the removal means removes the detection signal only in the predetermined repetition cycle as the interference wave component.

14. A target object detection method of a radar apparatus transmitting pulse signals at predetermined repetition cycles and receiving and analyzing the pulse signal reflected by a target object to thereby detect the target object, the target object detection method comprising:
a transmitting step of transmitting the pulse signals at the repetition cycles of T1 to Tn where n is greater than 1;
a receiving step receiving each of the pulse signals of the repetition cycles of T1 to Tn reflected by the target object;
a detecting step of detecting a distance to the target object by performing predetermined processing on each of the pulse signals;
a setting step of setting at least a part of the repetition cycles of T1 to Tn to be different, and for setting a total time of the repetition cycles of T1 to Tn as a constant sampling period;
a removing step of removing the target object as an interference wave from another radar apparatus or clutter when the distance to the target object detected in a repetition cycle of the repetition cycles or a period subsequent to the repetition cycle in the detecting step and another distance to the target object detected in another period other than that in the detecting step are different.

15. The target object detection method according to claim 14, wherein
the setting step comprises the setting so that at least a part of the repetition cycles of the pulse signals is different and so that a sampling cycle for sampling the pulse signal is constant, and
the removal step comprises removing the target object as the clutter when the distance to the target object detected in the period subsequent to the repetition cycle by the detecting step and the another distance to the target object detected in the another period other than that by the detecting step are different.

16. The target object detection method according to claim 15, wherein
the setting step comprises the setting so that all the repetition cycles of the plurality of pulse signals existing in the sampling cycle are different.

17. The target object detection method according to claim 15, wherein
the setting step comprises setting the repetition cycles with a unit being the pulse signals being repeated a predetermined times at the same repetition cycles, and setting so that the repetition cycle of at least a part of unit among the plurality of units is different.

18. The target object detection method according to claim 15, wherein
the removal step comprises averaging a detection signal in the repetition cycle and a another detection signal in the repetition cycle to thereby make a clutter component relatively small.

19. The target object detection method according to claim 15, wherein
the removal step comprises removing the detection signal only in the predetermined repetition cycle as the clutter.

20. The target object detection method according to claim 14, wherein
the setting step comprises the setting so that at least a part of the repetition cycles of the pulse signals is different, and
the removal step comprises removing the target object as the interference wave from the another radar apparatus when the distance to the target object detected in the repetition cycle by the detecting step and the another distance to the target object detected in the another period other than that by the detecting step are different.

* * * * *

UNITED STATES PATENT AND TRADEMARK OFFICE
CERTIFICATE OF CORRECTION

| | |
|---|---|
| PATENT NO. | : 10,725,163 B2 |
| APPLICATION NO. | : 15/553160 |
| DATED | : July 28, 2020 |
| INVENTOR(S) | : Hiroyasu Yano, Yasushi Aoyagi and Kodai Kukita |

It is certified that error appears in the above-identified patent and that said Letters Patent is hereby corrected as shown below:

On the Title Page

Item (73), Assignee "FURUKAWA ELECTRIC CO., LTD., Chiyoda-ku, Tokyo, (JP)" should be
--FURUKAWA ELECTRIC CO., LTD., Chiyoda-ku, Tokyo, (JP) and FURUKAWA AUTOMOTIVE SYSTEMS INC., Shiga, (JP)--.

Signed and Sealed this
Eighth Day of December, 2020

Andrei Iancu
*Director of the United States Patent and Trademark Office*